United States Patent
Pot et al.

(10) Patent No.: US 8,834,115 B2
(45) Date of Patent: Sep. 16, 2014

(54) GIRDER FOR SUPPORTING A TIDAL TURBINE FAIRING AND TIDAL TURBINE COMPRISING SUCH A GIRDER

(75) Inventors: Nicolas Pot, Grenoble (FR); Thibault Thouvenin, Grenoble (FR)

(73) Assignee: Alstom Renewable Technologies, Grenoble (FR)

( * ) Notice: Subject to any disclaimer, the term of this patent is extended or adjusted under 35 U.S.C. 154(b) by 401 days.

(21) Appl. No.: 13/247,130

(22) Filed: Sep. 28, 2011

(65) Prior Publication Data
US 2012/0082544 A1 Apr. 5, 2012

(30) Foreign Application Priority Data
Sep. 30, 2010 (FR) .................................... 10 57907

(51) Int. Cl.
F03B 3/18 (2006.01)
F04D 29/68 (2006.01)
F03B 17/06 (2006.01)

(52) U.S. Cl.
CPC ................. *F03B 3/18* (2013.01); *F03B 17/061* (2013.01); *Y02E 10/38* (2013.01); *Y02E 10/28* (2013.01); *F05B 2240/97* (2013.01); *Y02E 10/223* (2013.01)
USPC ............ 415/211.2; 415/220; 290/53; 290/54; 416/231 B

(58) Field of Classification Search
CPC ....................................... F03B 3/18
USPC ................. 415/211.2, 220, 914; 290/53, 54; 416/231 B
See application file for complete search history.

(56) References Cited

U.S. PATENT DOCUMENTS

| | | | | |
|---|---|---|---|---|
| 2,135,887 | A * | 11/1938 | Fairey | 416/23 |
| 3,075,743 | A * | 1/1963 | Sheets | 415/220 |
| 3,937,594 | A * | 2/1976 | Ito et al. | 416/223 A |
| 4,146,197 | A * | 3/1979 | Grotz | 244/12.5 |
| 4,613,279 | A | 9/1986 | Corren | |
| 4,976,349 | A * | 12/1990 | Adkins | 244/207 |
| 6,435,815 | B2 * | 8/2002 | Harvey et al. | 415/115 |
| 6,464,171 | B2 * | 10/2002 | Ruffin | 244/130 |
| 6,905,092 | B2 * | 6/2005 | Somers | 244/3 |
| 7,874,788 | B2 * | 1/2011 | Stothers et al. | 415/4.5 |
| 8,061,983 | B1 * | 11/2011 | Bowers et al. | 415/211.2 |

(Continued)

FOREIGN PATENT DOCUMENTS

WO 2006/029496 A1 3/2006
WO 2009/126996 A1 10/2009

*Primary Examiner* — Edward Look
*Assistant Examiner* — Wayne A Lambert
(74) *Attorney, Agent, or Firm* — Buchanan Ingersoll & Rooney PC

(57) ABSTRACT

This girder (8) for supporting a tidal turbine fairing has a parallelogram-shaped cross-section (S), taken perpendicularly to a longitudinal axis (A8) of the girder (8). It includes at least one slot (86*a*, 86*b*) extending generally parallel with the longitudinal axis (A8) of the girder (8). a cross-section (S) taken perpendicularly to the longitudinal axis (A8) of the girder (8), the traces of the surfaces bordering the slot (86*a*, 86*b*) extend from one of the long sides (801, 803) of the cross-section (S) to an adjacent short side (802, 804) of the cross-section (S).

15 Claims, 2 Drawing Sheets

(56) References Cited

U.S. PATENT DOCUMENTS

| | | | |
|---|---|---|---|
| 8,303,250 B2* | 11/2012 | Mohammed et al. | 416/23 |
| 2007/0284884 A1* | 12/2007 | Stothers et al. | 290/54 |
| 2008/0232957 A1* | 9/2008 | Presz et al. | 415/191 |
| 2008/0240916 A1* | 10/2008 | Krouse | 415/211.2 |
| 2008/0265583 A1 | 10/2008 | Thompson | |
| 2010/0266385 A1* | 10/2010 | Praisner | 415/115 |
| 2010/0303634 A1* | 12/2010 | Long | 416/90 A |
| 2011/0042952 A1* | 2/2011 | Ohya et al. | 290/52 |

* cited by examiner

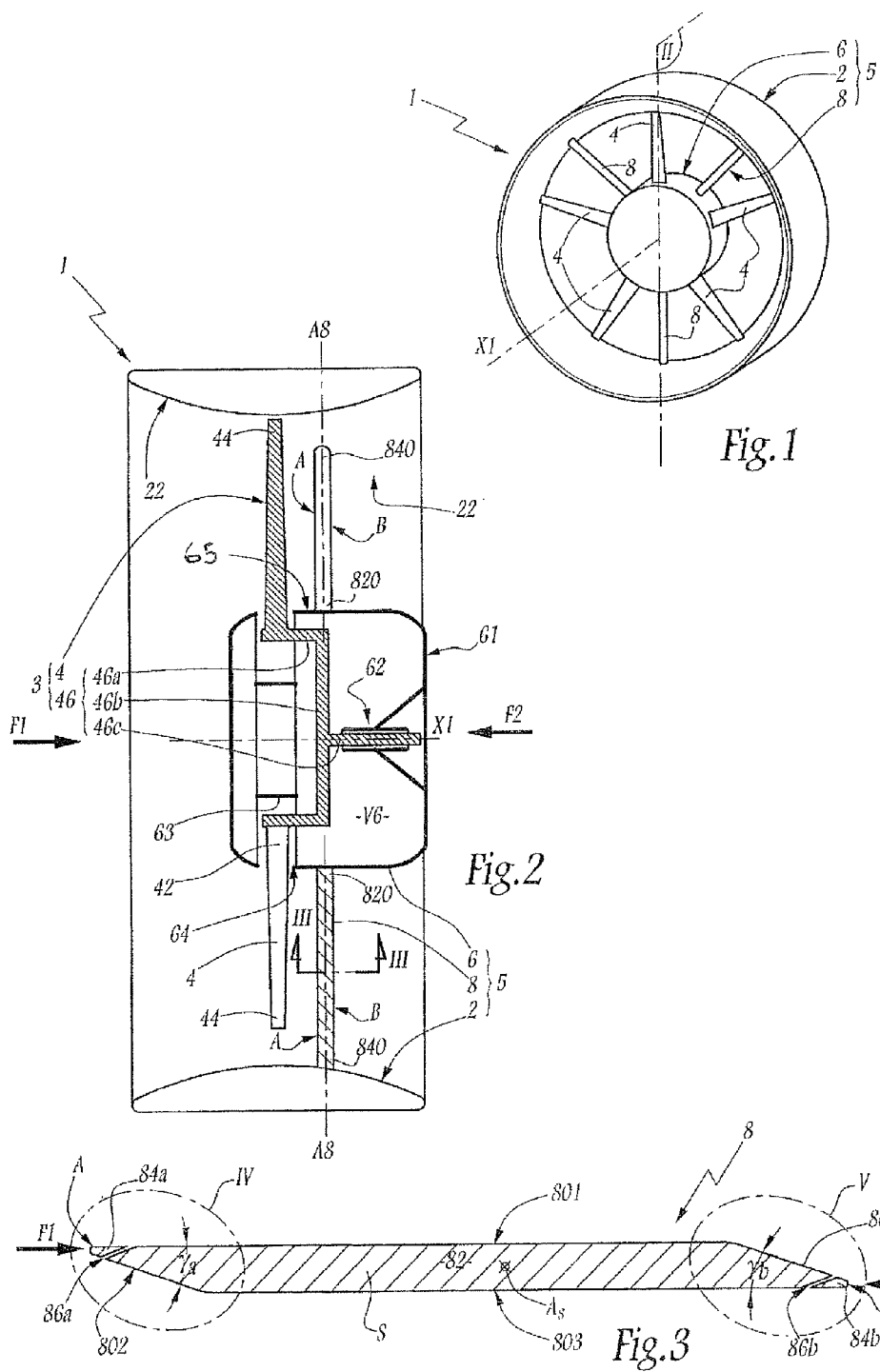

GIRDER FOR SUPPORTING A TIDAL TURBINE FAIRING AND TIDAL TURBINE COMPRISING SUCH A GIRDER

The present invention relates to a girder for supporting a tidal turbine fairing and a tidal turbine comprising such a girder.

A tidal turbine generator wheel, such as that known for example from the document WO-A-2009/126996, comprises a central hub having a revolving shape about the axis of rotation of the wheel, and blades rigidly connected to the hub extending radially outwards from the hub. The tidal turbine may be equipped with an external fixed fairing surrounding the wheel thereof and having a revolving shape about the axis of rotation of the wheel. The fairing defines a cylindrical volume inside which the blades and the hub extend. Known supporting girders are used for assembling the fairing with a fixed supporting member encasing the hub. These girders generally have a rectangular cross-section, wherein the long edges are parallel with the water flow passing through the blades when the tidal turbine is in operation.

In operation, water runs along the girders at the sides thereof corresponding to the long edges of the cross-section thereof. Karman vortices tend to form downstream from the girder and cause mechanical stress in the girder liable to give rise to cracking, which is not satisfactory.

The invention is more specifically intended to remedy these drawbacks by providing a supporting girder in which the shape makes it possible, when the girder is subjected to a water flow during tidal turbine operation, to limit, or even prevent, Karman vortices formation.

To this end, the invention relates to a girder for supporting a tidal turbine fairing having a parallelogram-shaped cross-section, taken perpendicularly to a longitudinal axis of the girder. The girder comprises at least one slot extending generally parallel with the longitudinal axis of the girder. In a cross-section taken perpendicularly to the longitudinal axis of the girder, the traces of the surfaces bordering the slot extend from one of the long sides of the cross-section to an adjacent short side of the cross-section.

By means of the invention, water can flow into the slot, stabilising the water flow along the girder and prevention Karman vortices formation downstream from the girder.

According to advantageous but optional aspects of the invention, such a supporting girder may incorporate one or a plurality of the following features, taken in any technical feasible combination:

The short side of the cross-section forms an acute angle with the adjacent long side of the cross-section.

In a perpendicular plane to the longitudinal axis of the girder, an angle situated outside the girder, on the side of a joining edge between the short side of the cross-section and the long side of the cross-section with respect to the slot, and defined between a portion of the long side, situated on the side of the edge with respect to the slot, and a median or mean axis of the slot, is greater than 90°.

In a perpendicular plane to the longitudinal axis of the girder, the angle situated outside the girder is greater than 120°, preferably between 130° and 160°, and more preferably in the region of 150°.

In a perpendicular plane to the longitudinal axis of the girder, an angle, situated inside the girder, and defined by a long side of the parallelogram and by a short side of the parallelogram forming an obtuse angle with the long side, is greater than 90°, preferably greater than 120°, more preferably in the region of 150°.

At least two slots extend from the same long side of the parallelogram.

The slots extending from the same long side of the parallelogram are parallel.

At least one slot extends from each long side.

The girder is equipped with fixing means for assembling two parts of the girder situated on either side of the same slot.

At least one part of the girder, situated on the side of a joining edge between the short side of the cross-section and the long side of the cross-section with respect to the slot, is made of a material having a greater mechanical strength than that of the material forming a part of the girder situated opposite the edge with respect to the slot.

The invention also relates to a tidal turbine comprising a rotatable wheel about an axis, a fixed fairing surrounding the wheel and at least one girder for supporting the fairing according to the invention, connecting the fairing to a central tidal turbine supporting member.

The invention will be understood more clearly and further advantages thereof will emerge more clearly in the light of the following description of a tidal turbine and a girder for supporting a fairing according to the invention, given merely as an example, with reference to the appended drawings wherein:

FIG. 1 is a perspective view of a tidal turbine comprising three supporting girders according to the invention;

FIG. 2 is a section on a larger scale, along plane II in FIG. 1;

FIG. 3 is a section on a larger scale, along the line III-III in FIG. 2;

Figure 4:
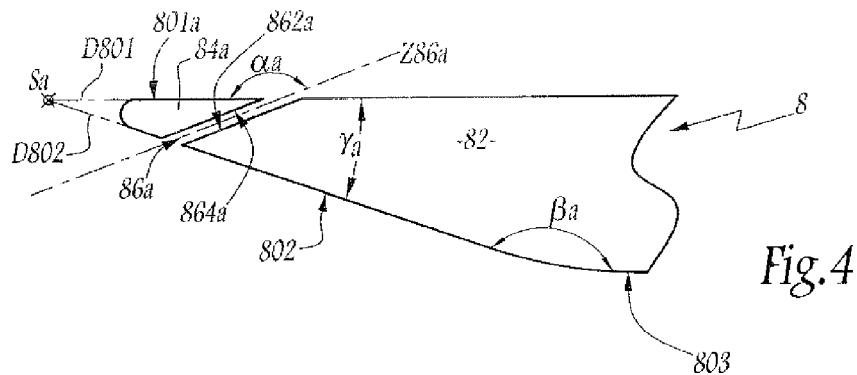
FIG. 4 is a view, on a larger scale, of the detailed drawing IV in FIG. 3.

FIGS. 1 and 2 show a tidal turbine 1 having an axis X1 comprising an outer fairing 2, a wheel 3, five blades 4, a fixed and central supporting member 6 and three supporting girders 8.

Hereinafter in the description, the term "axial" refers to a direction parallel to the axis X1, and the term "radial" refers to a direction perpendicular to the axis X1 and secant therewith, or a surface perpendicular to a radial direction. Moreover, an element referred to as proximal is situated closer to the axis X1 than an element referred to as distal.

As shown more specifically in FIG. 2, the fairing 2 is hollow and has an annular shape about the axis X1 and the central supporting member 6 is a circular based cylinder extending along the axis X1 and comprising an outer casing 61. The supporting girders 8 extend radially, each along the longitudinal axis A8 thereof, and connect the supporting member 6 to the fairing 2. The proximal ends 820 of the girders 8 are fixed to an outer radial surface 65 of the casing 61 and the distal ends 840 of the girders 8 are fixed to an inner radial surface 22 of the fairing 2. The outer radial surface 65 comprises an annular groove 64 for inserting the blades 4. Fixing means 63 connect the parts of the supporting member 6 situated on either side of the groove 64. The fairing 2, the girders 8 and the supporting member 6 are rigidly connected and form a part 5 of the tidal turbine 1 which is stationary when the tidal turbine 1 is in operation.

The blades 4 extend radially and the proximal ends 42 are fixed to a circular-based cylindrical portion 46a of a hub 46 situated inside the outer casing 61 of the supporting member 6. A portion 46b of the hub 46, in the form of a disk with the axis X1, is connected to the portion 46a and to a portion 46c of the hub 46 shaped in the form of a rod with the axis X1. The portion 46c of the hub 46 is rotationally guided by a bearing 62 comprised in the supporting member 6. The hub 46 rotates the input shaft of an alternator not shown. The distal ends 44 of the blades 4 are flush with the inner radial surface 22 of the fairing 2. Together, the blades 4 and the hub 46 form the wheel 3 of the tidal turbine 1 which is rotatable about the axis X1 with respect to the fixed part 5.

In operation, a water flow F1 or F2, generally parallel with the axis X1, passes through the tidal turbine 1 in either direction.

As shown in FIG. 3, the girders 8 are prisms in which the cross-section S, taken perpendicularly to the longitudinal axes A8 thereof, has an overall parallelogram shape comprising two long sides 801 and 803 parallel with the axis X1 and two short sides 802 and 804. An acute angle γa, situated inside the parallelogram, is defined between the sides 801 and 802, and an acute angle γb, situated inside the parallelogram, is defined between the sides 803 and 804. The angles γa and γb are equal. However, this is not mandatory.

The join of the sides 801 and 802 forms a first edge A of the girder 8 and the join of the sides 803 and 804 forms a second edge B of the parallelogram. The edges A and B are rounded.

A leading edge of the girder 8 is the edge A or B of the girder 8 with which the flow F1 or F2 first comes into contact and a trailing edge of a girder 8 is, in the direction of flow of the flow F1 or F2, the edge A or B situated downstream, i.e. on the side towards which the flow F1 or F2 flows, with respect to the leading edge.

In this way, for the flow F1, the edge A forms a leading edge of the girder 8 and the edge B forms a trailing edge of the girder 8, and, for the flow F2, the edge B forms a leading edge of the girder 8 and the edge A forms a trailing edge of the girder 8.

The girders 8 each comprise a main element 82, situated opposite the edges A and B with respect to the slots 86a and 86b, and two appendages 84a and 84b respectively situated on the side of the edge A or the edge B with respect to the slots 86a or 86b. A residual space extending between the main element 82 and the appendage 84a forms a slot 86a, and a residual space extending between the main element 82 and the appendage 84b forms a slot 86b. The appendages 84a and 84b are assembled with the main element 82. This assembly may be carried out, for example, by welding elements not shown, distributed between the proximal end 820 and the distal end 840 of the girder 8, and connecting the main element 82 to the appendages 84a and 84b. Further fixing means may be, for example, screws engaging with threaded holes provided in the main element 82 and in the appendages 84a and 84b.

The slots 86a and 86b, the appendages 84a and 84b and the main element 82 extend from the proximal end 820 to the distal end 840 of each girder 8.

As shown in FIG. 4, the slot 86a extends along a median axis Z86a. An angle αa, approximately equal to 150°, is defined between a portion 801a of the side 801 belonging to the appendage 84a, and a portion of the axis Z86a extending outside the girder 8, beyond the side 801, i.e. on the side of the edge A. The angle αa is situated outside the girder 8, on the side of the joining edge A between the short side 802 of the cross-section S and the long side 801 of the cross-section S with respect to the slot 86a. The angle αa is greater than 90°.

Preferably, the angle αa is greater than 120° and is between 130° and 160°. Preferably, the angle αa is approximately equal to 150°.

The side 803 forms with the side 802 an angle βa approximately equal to 150° situated on the side of the girder 8. The angle βa is greater than 90°, preferably greater than 120°. Preferably, the angle βa is approximately equal to 150°.

The angles αa and βa may have the same value. However, this is not mandatory.

A vertex Sa of the acute angle γa is defined at the intersection point of lines D801 and D802, represented in dotted lines, whereby the sides 801 and 802 of the parallelogram in FIG. 3 extend respectively.

A surface of the main element 82 bordering the slot 86a is referenced 862a. A surface of the appendage 84a bordering the slot 86a is referenced 864a. In this way, the slot 86a is situated between the surfaces 862a and 864a. More specifically, in a section taken perpendicularly to the longitudinal axis A8 of the girder 8, the traces of the surfaces 862a and 864a bordering the slot 86a extend from the long side 801 of the cross-section S and to the adjacent short side 802 of the cross-section S. The term trace of the surface 862a or 864a refers to the segment situated at the intersection of the cross-section S and the surface 862a or 864a. Furthermore, the short side 802 of the cross-section S forms an acute angle γa with the long side 801 of the cross-section S.

The shape of the end of the girder 8 situated on the side of the edge A may be transposed on the side of the edge B by performing a central symmetry about the intersection point of the diagonal lines of the parallelogram represented in FIG. 3.

Figure 5:
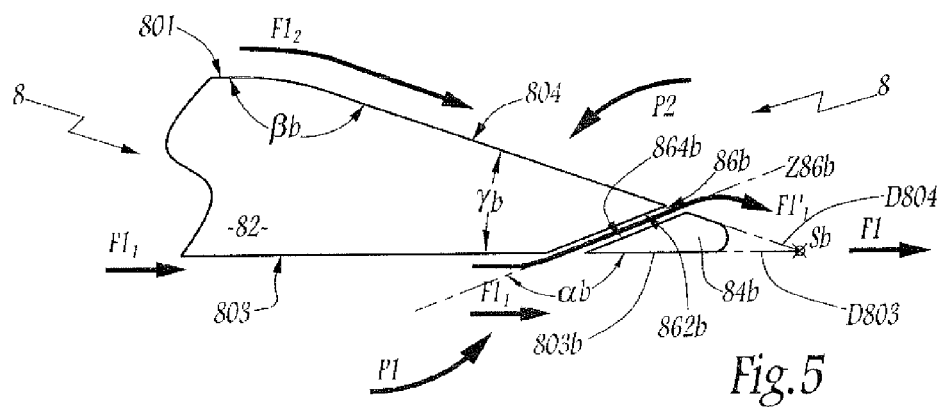
FIG. 5 is a view, on a larger scale, of the detailed drawing V in FIG. 3.

FIG. 5 shows, in more detail, the end of the girder 8 situated on the side of the edge B. The slot 86b extends along a median axis Z86b. An angle αb, situated outside the girder 8, on the side of the edge B with respect to the slot 86b, is defined between a portion 803b of the side 803 belonging to the appendage 84b, and a portion of the axis Z86b extending outside the girder 8 beyond the side 803. The angle αb is situated outside the girder 8, on the side of the joining edge B between the short side 804 of the cross-section S and the long side 803 of the cross-section S with respect to the slot 86b.

An angle βb, situated inside the girder 8, is defined between the sides 801 and 804 of the parallelogram in FIG. 3.

The angles αb and βb are respectively equal to the angles αa and βa. However, this is not mandatory, provided that αa and βb are greater than 90°.

A vertex Sb of the acute angle γb is defined at the intersection point of lines D803 and D804, represented in dotted lines, whereby the sides 803 and 804 of the parallelogram in FIG. 3 extend respectively.

A surface of the main element 82 bordering the slot 86b is referenced 862b. A surface of the appendage 84b bordering the slot 86b is referenced 864b. In this way, the slot 86b is situated between the surfaces 862b and 864b. More specifically, the surfaces 862b and 864b border the slot 86b and extend from the long side 803 of the cross-section S of the girder 8 and to the short adjacent side 804 forming an acute angle γb with the long side 801.

In operation, the tidal turbine 1 is installed under water, for example in a marine environment, and the fixed part 5 is connected to a fixed element, for example to the ground. The blades 4 are rotated about the axis X1 by the water flow F1 or F2, in either direction, actuating the alternator and enabling electricity production.

The flow of the water in the case of the flow F1 is described hereinafter. When the water circulates in the direction of the flow F2, a symmetric flow appears.

When the flow F1 reaches the edge A of a girder 8, forming a leading edge of the girder 8, the flow F1 is divided into two parts $F1_1$ and $F1_2$ and continues the progression thereof towards the edge B, forming a trailing edge of the girder 8. The first part F1, of the flow F1 runs along the girder 8 along the side 803 and the second part $F1_2$ of the flow F1 runs along the girder 8 on the side 801.

A positive pressure zone P1 appears at the end of the side 803 situated in the vicinity of the edge B, and a negative pressure zone P2 appears on the side situated in the vicinity of the edge B. The pressure differential resulting from this positive pressure and negative pressure exhausts a part $F1_1'$ of the first part $F1_1$ of the water flow F1 inside the slot 86b. The water thus flows in the slot 86b, from the end of the slot 86b situated along the side 803 to the end of the slot 86b situated along the side 804, and joins the second part $F1_2$ of the flow F1 and flows along the side 804 towards the edge B. In this way, a water boundary layer extending along the sides 801, 803 and 804 of the girder 8 is stabilised by means of the slot 86b and Karman vortices formation is limited, or even prevented. In the case of the flow F1, the slot 86a is optional and only the slot 86b contributes to flow stabilisation.

The presence of two slots 86a and 86b situated on the edge A and the edge B of the girder 8 makes it possible to stabilise the flow of the flow F1 or the flow F2, which is advantageous if the tidal turbine is subject to flows in variable directions, for example when the tidal turbine 1 is actuated by tidal flows or back-flows.

Figure 6:
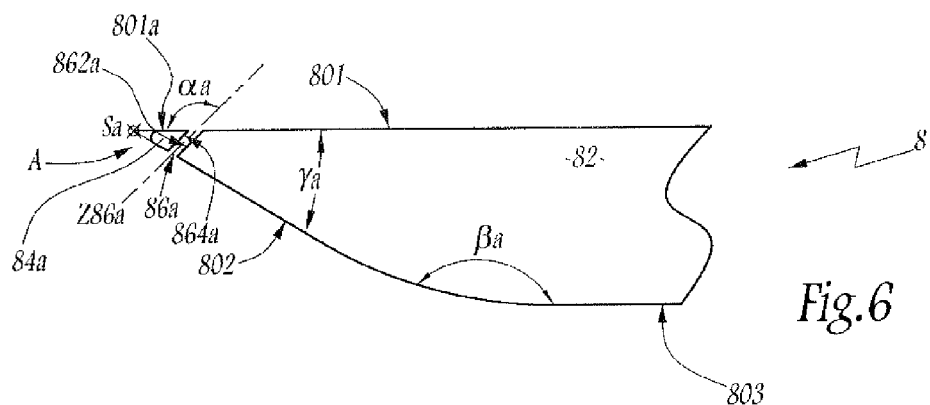
FIG. 6 is a view, similar to FIG. 4, for a second embodiment of the invention.

FIG. 6 illustrates a second embodiment of the girder 8 wherein the equivalent elements to those in FIG. 4 bear the same references.

The girder 8 shown in FIG. 6 has an angle αa approximately equal to 130° and less than the angle αa of the girder 8 in FIG. 4. The angle αa is greater than 90°.

The slot 86a of the girder 8 in FIG. 6 is situated closer to the edge A than the slot 86a of the girder 8 in FIG. 4. Moreover, the girder 8 in FIG. 6 has an angle βa approximately equal to 130°. The angle αa in FIG. 6 is greater than 90° and less than the angle βa of the girder 8 in FIG. 4.

Figure 7:
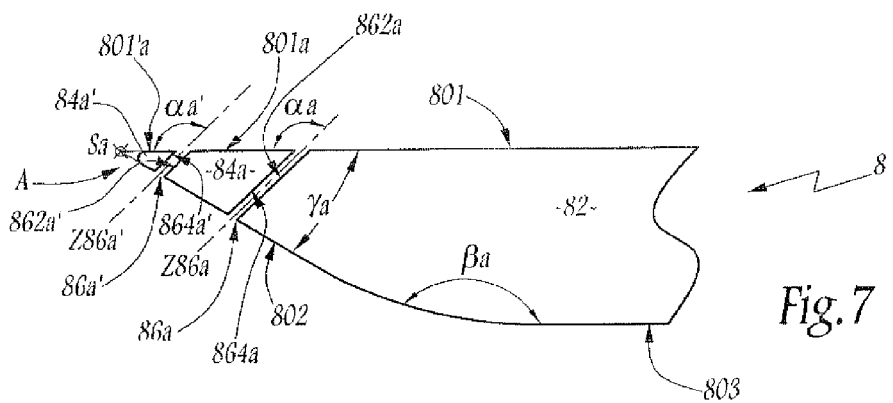
FIG. 7 is a view, similar to FIG. 4, for a third embodiment of the invention.

FIG. 7 consists of a third embodiment of the girder 8 wherein the equivalent elements to those in FIGS. 4 and 5 bear the same references. The girder 8 shown in FIG. 7 comprises two appendages 84a and 84a' both situated on the side of the edge A of the girder 8. The appendage 84a' is closer to the edge A than the appendage 84a. A first residual space situated between the main element 82 and the appendage 84a defines a first slot 86a extending along the axis Z86a. A second residual space situated between the appendage 84a and the appendage 84a' defines a second slot 86a' extending along the axis Z86a'.

An angle αa, situated outside the girder 8 and on the side of the edge A with respect to the slot 86a, is defined between a portion 801a on the side 801 belonging to the appendage 84a and a portion of the axis Z86a extending outwards from the girder 8, beyond the side 801.

An angle αa', situated outside the girder 8 and on the side of the edge A with respect to the slot 86a', is defined between a portion 801a' of the side 801 belonging to the appendage 84a', and a portion of the axis Z86a' extending outwards from the girder 8, beyond the side 801.

The angles αa and αa' are equal and the axes Z86a and Z86a' of the slots 86a and 86a' are parallel. However, in a further embodiment of the invention, the angles αa and αa' may be different, insofar as the slots 86a and 86a' do not intersect.

A surface of the main element 82 bordering the slot 86a is referenced 862a. A surface of the appendage 84a bordering the slot 86a is referenced 864a. In this way, the slot 86a is situated between the surfaces 862a and 864a.

A surface of the main element 82 bordering the slot 86a' is referenced 862a'. A surface of the appendage 84a bordering the slot 86a' is referenced 864a'. In this way, the slot 86a' is situated between the surfaces 862a' and 864a'.

The girder 8 shown in FIG. 3 comprises, on each edge A and B, a slot 86a or 86b, but in a further embodiment of the invention, not shown, the girder 8 may comprise a single slot 86a or 86b extending between the main element 82 and a single appendage 84a or 84b. In this case, the slot 86a or 86b is situated in the vicinity of the trailing edge of the girder 8, i.e. on the side of the edge B in the case of the flow F1 or the side of the edge A in the case of the flow F2. In this case, the girder 8 is suitable for stabilising the water flow F1 or F2 when the water circulates in a single direction.

Moreover, provided that the slot 86a extends from the side 801 and to the side 802, the axis Z86a may be situated at a varying distance from the edge A. Furthermore, for the third embodiment, the distance between the axes Z86a and Z86a' of the slots 86a and 86a' may vary.

According to a further embodiment of the invention, not shown, and provided that the girder 8 comprises at least one slot 86a or 86b, the girder 8 may have, in the vicinity of each of the edges A and B thereof, a number of slots greater than or equal to zero, and the number of slots on each edge A and B of the girder 8 may be different. For example, the end of the girder 8 situated on the side of the edge A may comprise one slot 86a, and the end of the girder 8 situated on the side of the edge B may comprise two slots 86b.

Since the appendages 84a and 84b are subject to greater mechanical stress than the main element 82, the appendages 84a and 84b may advantageously be formed from a material having a greater mechanical strength than that of the main element 82. For example, the appendages 84a and 84b may be made of high-strength steel, whereas the main element is made of soft steel, or conversely. In an alternative embodiment of the invention, the appendages 84a and 84b are hollow, whereas the main element 82 is solid, or conversely.

The tidal turbine 1 shown in FIG. 1 comprises three girders 8 and five blades 4. In an alternative embodiment, the tidal turbine 1 may comprise a number of girders 8 different to three and a number of blades 4 different to five.

The cross-section of a slot 86a, 86a' or 86b, taken in a perpendicular plane to the longitudinal axis A8 of a girder 8, may not be rectilinear and, for example, be in the form of a portion of a curve. In this case, the axis Z86a, Z86a' or Z86b of such a slot 86a, 86a' or 86b is defined as the mean axis of the curve portion.

Moreover, the slots 86a, 86a' and 86b may extend along a longitudinal axis which is inclined with respect to the longitudinal axis A8 of the girder 8. In this way, the slots 86a, 86a' and 86b may extend while being parallel or practically parallel with the longitudinal axis A8 of the girder 8. In this way, these slots are overall parallel with this axis.

The features of the embodiments and alternative embodiments envisaged above may be combined together.

In an alternative embodiment, the cross-section S of the girder 8 may have a rectangular shape, the rectangle being a specific parallelogram. In this case, the angles αa and αb are not acute angles but right angles.

The invention claimed is:
1. A girder for supporting a fairing of a tidal turbine, the girder comprising:
a parallelogram-shaped cross-section, taken perpendicularly to a longitudinal axis of the girder; and at least one slot extending generally parallel with the longitudinal axis of the girder, in a cross-section taken perpendicularly to the longitudinal axis of the girder, traces of surfaces bordering the slot extend from one of long sides of the cross-section to an adjacent short side of the cross-section.

2. The girder according to claim 1, wherein the short side of the cross-section forms an acute angle with the adjacent long side of the cross-section.

3. The girder according to claim 1, wherein, in a perpendicular plane to the longitudinal axis of the girder, an angle, situated outside the girder, on the side of a joining edge between the short side of the cross-section and the long side of the cross-section with respect to the slot, and defined between a portion of the long side, situated on the side of the edge with respect to the slot, and a median or mean axis of the slot, is greater than 90 degree.

4. The girder according to claim 3, wherein, in a perpendicular plane to the longitudinal axis of the girder, the angle, situated outside the girder is greater than 120°.

5. The girder according to claim 3, wherein, in a perpendicular plane to the longitudinal axis of the girder, the angle, situated outside the girder is between 130° and 160°.

6. The girder according to claim 3, wherein, in a perpendicular plane to the longitudinal axis of the girder, the angle, situated outside the girder is in the region of 150°.

7. The girder according to claim 1, wherein, in a perpendicular plane to the longitudinal girder axis, an angle, situated inside the girder, and defined by a long side of the parallelogram and by a short side of the parallelogram forming an obtuse angle with the long side, is greater than 90°.

8. The girder according to claim 1, wherein at least two slots extend from the same long side of the parallelogram.

9. The girder according to claim 8, wherein the slots extending from the same long side of the parallelogram are parallel.

10. The girder according to claim 1, wherein at least one slot extends from each long side.

11. The girder according to claim 1, wherein the girder is equipped with fixing means for assembling two parts of the girder situated on either side of the same slot.

12. The girder according to claim 1, wherein at least one part of the girder, situated on the side of a joining edge between the short side of the cross-section and the long side of the cross-section with respect to the slot, is made of a material having a greater mechanical strength than that of the material forming a part of the girder situated opposite the edge with respect to the slot.

13. A tidal turbine comprising a rotatable wheel about an axis, a fixed fairing encasing the wheel and at least one girder for supporting the fairing connecting the fairing to a central water turbine supporting member, wherein the girder is according to claim 1.

14. The girder according to claim 1, wherein, in a perpendicular plane to the longitudinal girder axis, an angle, situated inside the girder, and defined by a long side of the parallelogram and by a short side of the parallelogram forming an obtuse angle with the long side greater than 120°.

15. The girder according to claim 1, wherein, in a perpendicular plane to the longitudinal girder axis, an angle, situated inside the girder, and defined by a long side of the parallelogram and by a short side of the parallelogram forming an obtuse angle with the long side, is in the region of 150°.

* * * * *